United States Patent [19]
Skoufis et al.

[11] Patent Number: 5,571,601
[45] Date of Patent: Nov. 5, 1996

[54] CLEANING TAPE WITH IMPROVED EDGE ADHESIVE

[75] Inventors: John Skoufis, Denville; Cary Africk, Montclair, both of N.J.; John M. Questel, Cayahoga Falls; Wayne Mazorow, Akron, both of Ohio

[73] Assignee: The Texwipe Company, Upper Saddle River, N.J.

[21] Appl. No.: 369,373

[22] Filed: Jan. 6, 1995

[51] Int. Cl.$^6$ ............................................. B32B 9/00
[52] U.S. Cl. ..................... 428/192; 428/36.3; 428/261; 428/262; 428/289; 428/290
[58] Field of Search ................... 428/36.3, 192, 428/261, 262, 289, 290

[56] References Cited

U.S. PATENT DOCUMENTS

| | | | |
|---|---|---|---|
| 732,889 | 7/1903 | Paver | 428/245 |
| 1,773,967 | 8/1930 | Dreyfus. | |
| 2,241,384 | 5/1941 | Bateman et al. | 428/261 |
| 3,316,117 | 4/1967 | Clifford et al. | 117/4 |
| 3,552,994 | 1/1971 | Dipner | 428/261 |
| 3,616,146 | 10/1971 | Gabet | 428/261 |
| 3,658,574 | 4/1972 | Izzi et al. | 428/261 |
| 3,934,067 | 1/1976 | Goldman et al. | 428/290 |
| 4,384,021 | 5/1983 | Aoyama | 428/193 |
| 4,545,843 | 10/1985 | Bray | 428/261 |
| 4,880,683 | 11/1989 | Stow | 428/290 |
| 4,888,229 | 12/1989 | Paley | 428/192 |
| 5,153,043 | 10/1992 | Wang | 428/192 |

*Primary Examiner*—Patrick Ryan
*Assistant Examiner*—Cathy K. Lee
*Attorney, Agent, or Firm*—Curtis, Morris & Safford, P.C.; Gregor N. Neff

[57] ABSTRACT

A cleaning tape is edge-stabilized using an adhesive that is solvent resistant. The edge-stabilizing adhesive is a one-step cross-linkable formulation of polyvinyl alcohol, ammonium zirconium carbonate, an acetylinic surfactant and a non-silicone defoaming agent. The formulation is applied to the sides of a woven cotton cleaning tape roll and then is allowed to dry and cure. The resulting cleaning tape can be used in a surface buffing operation in which a solvent is applied to the cleaning tape, without contamination of the surface to be buffed by fibers from the tape or by the edge-stabilizing adhesive.

16 Claims, 1 Drawing Sheet

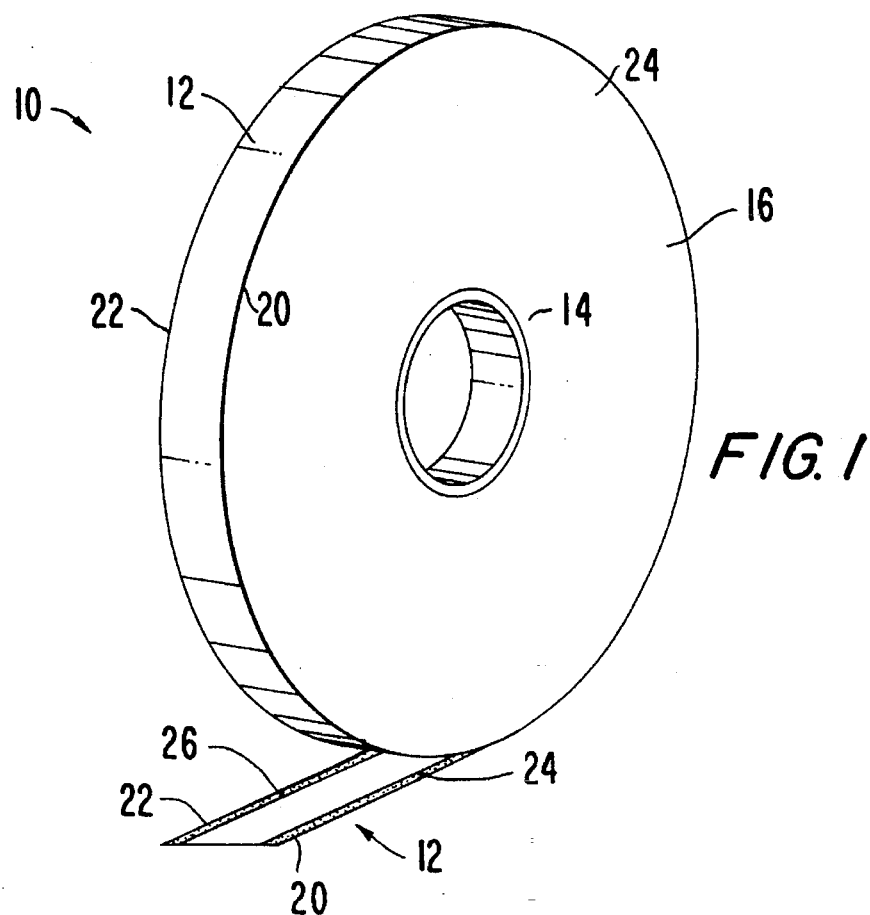
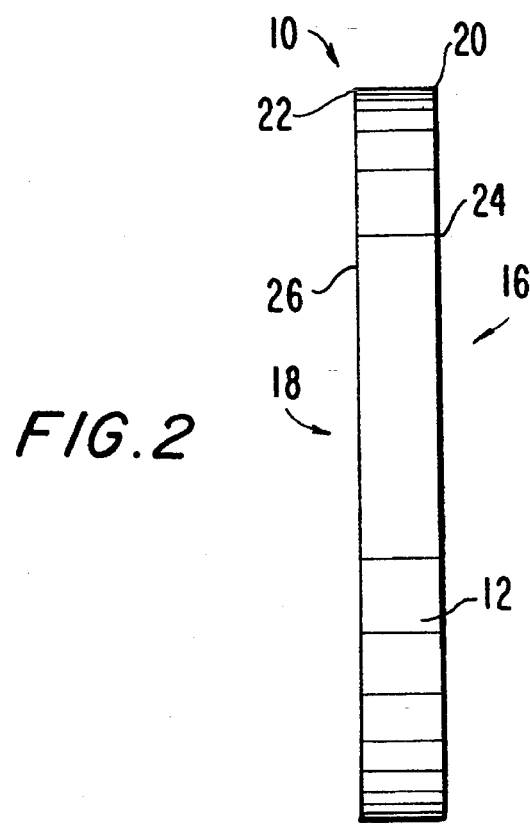

CLEANING TAPE WITH IMPROVED EDGE ADHESIVE

BACKGROUND OF THE INVENTION

This invention relates to fabric tape formed into a roll and particularly to such a roll having adhesive applied to the sides thereof for stabilizing the edges of the fabric tape.

It is known to provide rolls of fabric tape for a number of applications, including, for example, buffing the uppermost or "lube" layer of a plate formed as the disk component of a so-called fixed or "hard" information storage disk drive. As is known to those who are skilled in the art, the process of "lube buffing" the top surface of the hard disk plate is a finishing step in the process of manufacturing the disk. For this purpose it is preferred to employ a woven cotton tape. It is known to apply an adhesive to the edge of the tape in order to prevent the tape from fraying at the edges. If the tape is allowed to fray at the edges, cotton fibers may be deposited on the disk plate, resulting in contamination of the disk plate. As the desired information storage density on hard disks has increased, the tolerances for contaminants have become correspondingly more stringent.

The lube buffing process typically involves impregnating the cotton tape with a solvent such as a methyl alcohol solution. The solvent helps to evenly distribute the lubricant on the surface of the lube layer of the disk plate, and to aid in removing contaminants from the disk plate. However, applicants have become aware of a problem encountered in lube buffing with a solvent-impregnated tape having an edge-stabilizing adhesive. In particular, the solvent tends to dissolve the edge adhesive, causing the adhesive to be deposited on the disk plate which results in contamination of the disk plate.

Although it is possible to apply the tape to the lube layer surface in such a manner that the edges of the tape are maintained at a distance from the lube layer surface, such a manner of applying the tape to the surface fails to use the tape efficiently, and entails some inconvenience in handling the tape during lube buffing.

OBJECTS OF THE INVENTION

It is accordingly an object of the invention to provide an edge-stabilized cleaning tape that does not suffer from the disadvantages described above. In particular, it is an object to provide an edge-stabilized cleaning tape which can be impregnated with a solvent, and the entire surface of which can be applied to the surface to be cleaned, without having the edge-stabilizing adhesive deposited upon the surface to be cleaned.

SUMMARY OF THE INVENTION

In accordance with the present invention, the foregoing objects are met by the provision of a cleaning tape roll which includes a fabric tape wound around a core so that opposite edges of the tape form opposed substantially flat sides of the roll, and a dried adhesive layer on the sides of the roll for stabilizing the edges of the tape, with the adhesive being substantially solvent resistant. By providing a solvent resistant edge-stabilizing adhesive on a cleaning tape roll, contamination of the surface to be cleaned either by fibers released from the edge of the fabric tape, or from dissolved edge adhesive, can be substantially avoided or eliminated.

According to further aspects of the invention, the adhesive layer includes cross-linked polyvinyl alcohol and a cross-linking agent such as ammonium zirconium carbonate.

According to another aspect of the invention, there is provided a method of forming an edge-stabilized cleaning tape roll which includes the steps of providing a roll of fabric tape wound around a core so that opposite edges of the tape form opposed substantially flat sides of the roll, applying a cross-linkable adhesive formulation to the flat sides of the roll, and allowing the applied adhesive formulation to dry, cure and cross-link.

According to another aspect of the invention, the cross-linkable adhesive formulation can be stored for 24 hours or more before application to the sides of the tape roll. Such an adhesive formulation can be conveniently stored and/or transported prior to application.

According to yet another aspect of the invention, there is provided a solvent-resistant adhesive formulation for edge-stabilizing a roll of fabric tape, including an aqueous solution of polyvinyl alcohol, a cross-linking agent and at least one surfactant.

According to further aspects of the invention, the adhesive formulation includes an acetylinic surfactant and a non-silicone defoaming agent, the cross-linking agent includes ammonium zirconium carbonate, and the proportion of the polyvinyl alcohol to the cross-linking agent is substantially 10:1. Such a formulation provides a solvent-resistant edge-stabilizing adhesive which can be formulated and stored well in advance of application, and which dries and cures after application.

It is not intended that the invention be summarized here in its entirety. Rather, further features, aspects and advantages of the invention will be set forth in or be apparent from the following description and drawings. In the drawings:

BRIEF DESCRIPTION OF THE DRAWINGS

FIG. 1 is a perspective view of a cleaning tape roll provided in accordance with the present invention; and FIG. 2 is a front elevational view of the tape roll of FIG. 1.

DETAILED DESCRIPTION OF THE PREFERRED EMBODIMENT

Referring now to FIGS. 1 and 2, a tape roll 10 is formed of a fabric tape 12 wound around a core 14. The core 14 may be formed, for example, of molded plastic. The sides 16 and 18 of the roll 10 are formed by respective edges 20 and 22 of the tape 12. Preferably the tape 12 is a woven cotton fabric to which a rigorous cleaning process has been applied so that the tape 12 exhibits a substantially uniform cleanliness. However, the tape may be formed of fibers that are partially or entirely non-cotton, including synthetic fibers, and the tape may be a non-woven material. A typical size for the tape roll 10 is 1" wide by 8" in diameter.

As will be understood by those who are skilled in the art, there are two well known techniques for forming a cleaning tape roll.

According to the first technique, known as the "unwind-slit-rewind" technique, a relatively broad fabric sheet is unwound from a spindle and slit in the direction of unwinding using one or more heated blades (typically, for example, 10 to 40 blades) to form narrow fabric tapes which are then respectively rerolled on separate cores.

According to the second of the two techniques referred to above, the relatively broad sheet of fabric, while still wound around a spindle to form a substantially cylindrical fabric-and-spindle assembly, is cut in a direction normal to the longitudinal axis of the fabric-and-spindle assembly, and at a distance from one end of the assembly equal to the desired width of the tape roll, so that both the fabric and the spindle are cut in a single operation resulting in a tape roll of the desired width. Each subsequent cut is performed at the same distance from the newly formed end of the fabric-and-spindle assembly resulting in successive formation of tape rolls. This second technique is known as the "single knife slicing" technique.

It is contemplated by the present invention that either of the two techniques described above can be employed, provided only that the resulting tape roll has sides that are substantially flat and even. The "single knife slicing" technique is advantageous in that, with a suitable slicing knife, rolls with quite flat and even sides are produced. However, the single knife slicing technique places considerable demands on the slicing knife, particularly in connection with slicing through the spindle. To moderate such demands, it may be necessary to provide a spindle that is made of a relatively soft material, such as cardboard or paper, rather than plastic.

Alternatively, the unwind-slit-rewind technique can be used if the tape is rewound with sufficient control (e.g., sufficiently slowly) so that the re-wound roll exhibits flat and smooth sides, with the respective edges of the tape being brought into registry as the tape is rewound. One advantage of the unwind-slit-rewind technique is that the core need not be selected with a view to facilitating slicing, as in the single knife slicing technique. Although unheated blades are normally used in the unwind-slit-rewind technique, it is also contemplated that heated blades may be used.

In any event, regardless of the technique used to form the tape roll, an adhesive formulated in a manner to be described below is applied to the sides 16 and 18 of the tape roll 10 so that adhesive layers 24 and 26 are respectively formed on the sides 16 and 18. The adhesive is allowed to dry and cure, and then the adhesive layer may be sanded to produce a smooth adhesive layer of uniform thickness.

According to a preferred embodiment of the invention, a concentrated adhesive formulation is formed as an aqueous solution of polyvinyl alcohol, a cross-linking agent, and one or more surfactants or dispersants.

A satisfactory type of polyvinyl alcohol is known as "Airvol 350" available from Air Products and Chemicals, Inc , Allentown, Pa. A suitable cross-linking agent is an ammonium zirconium carbonate solution such as is sold under the designation "Bacote 20" by Magnesium Elektron, Inc., Flemington, N.J. This cross-linking agent will cause the adhesive to cross-link (cure) at substantially room temperature. The surfactants preferably include an acetylinic surfactant, such as "Surfynol S.E." (available from Air Products), for emulsifying the polyvinyl alcohol, and an auxiliary defoaming agent such as the nonsilicone defoamer known as "DEE-FO 97-2" supplied by Ultra Additives.

A preferred adhesive concentrate is prepared according to the following formula:

| Ingredient | % (by weight) |
| --- | --- |
| Water | 90.027 |
| Airvol 350 | 8.360 |
| Bacote 20 | 0.832 |
| Surfynol S.E. | 0.615 |
| DEE-FO 97-2 | 0.166 |

The adhesive concentrate is prepared by adding the first three ingredients in the order given, with mixing by a mechanical mixer and with heating up to around 180°–190° F. to aid in dissolving. The last two ingredients are added during cooling to room temperature and with stirring.

Prior to application, the concentrate is diluted by adding up to four parts by weight of water to six parts of concentrate. The diluted adhesive may be applied to the sides 16 and 18 of the tape roll by means of a brush or a two-pad pressure roller. The amount of dilution of the adhesive, and the pressure applied to the application rollers, are selected so that the dilute adhesive penetrates the sides of the tape roll to the extent of 1–3 threads. A doctor knife, or the like, is used to dispense an appropriate amount of the dilute adhesive onto the rollers. A suitable coating device is the Union Series #5, Model A, 14" Roller Coater available from The Union Tool Corp., Warsaw, Ind.

After application to the sides of the tape roll, the dilute adhesive is allowed to dry and cure at room temperature over a period of about 48 to 72 hours. With the formulation described above, cross-linking takes place only during the drying process.

After the adhesive layer 28 has dried, the same is sanded, preferably with vacuum, so that a smooth and clean adhesive layer 24 and 26 is respectively provided on the sides 16 and 18 of the tape roll 10. The resulting adhesive layers 24 and 26 satisfactorily stabilizes the edges 20 and 22 of the tape 12, while substantially resisting polar solvents such as methyl alcohol, isopropyl alcohol and the like. Substantial resistance is also provided to nonpolar solvents. In FIG. 1, a portion of the tape 12 is depicted as partially unrolled from the tape roll 10 during use in order to show adhesive layers 24 and 26 embedded in the edges 20 and 22 of the tape 12 when unrolled.

Polyvinyl alcohol was selected for the preferred formulation as being satisfactorily cross-linkable and nontoxic, while providing the necessary hardness after cure to permit sanding and also providing the desired amount of penetration into the edge of the fabric tape. It is contemplated to use cross-linking agents other than ammonium zirconium carbonate.

The surfactants are provided to promote satisfactory mixing of the adhesive formulation and also to prevent foaming, so that a smooth, nonfoamed adhesive film can be applied to the sides of the tape roll. It is to be noted that if foam were present in the applied adhesive, irregularities in the adhesive layer might result.

Uniformity in the adhesive layer is also promoted by using a woven cotton fabric tape that has been scrupulously cleaned to provide uniform cleanliness so that the adhesive is uniformly absorbed by the sides of the tape roll.

It is also to be noted that the formulation described above is of the "one-step" type; that is, cross-linking does not begin upon the mixing of the adhesive and the cross-linking agent, but rather is deferred until drying. This is advantageous in that the adhesive concentrate can be prepared well ahead of time before application and stored and/or transported conveniently in a ready-to-dilute or ready-to-apply form. It is believed that the formulation described above has a shelf life that is indefinite, i.e., on the order of one year or more.

In the preferred formulation described above, the proportion of polyvinyl alcohol to cross-linking agent was substantially 10:1, but proportions of those two ingredients within the range of 5:1 to 100:1 are also contemplated by the invention.

With a cleaning tape roll provided according to the present invention, lube buffing may be performed using a fabric tape impregnated with a solvent, while avoiding contamination of the hard disk plate by either fibers released from the edge of the tape or adhesive applied to stabilize the edge of the tape.

It is also within the contemplation of the invention to use other types of adhesives, such as acrylic adhesives, provided only that the same are crosslinkable and provide the necessary degree of hardness when cured. Acrylic adhesives are known which are self-crosslinking. Such adhesives may require heat curing at temperatures substantially above room temperature for full crosslink development, such as 275° F., and such heat cured adhesives are within the comtemplation of the present invention. Other cross-linkable adhesives may also be employed, whether self-crosslinking or requiring a cross-linking agent, and whether curable at room temperature, or at substantially higher temperature.

The above description of the invention is intended to be illustrative and not limiting. Various changes or modifications in the embodiments described may occur to those skilled in the art and these can be made without departing from the scope or spirit of the invention.

What is claimed is:

1. A cleaning tape roll comprising a cleaning tape wound into a roll so that opposite edges of said tape form opposed substantially flat sides of said roll, and a dried adhesive layer on said sides for stabilizing said edges of said tape, said adhesive being substantially solvent resistant.

2. A cleaning tape roll according to claim 1; wherein said adhesive layer is substantially resistant to solution by polar solvents.

3. A cleaning tape roll according to claim 2; wherein said adhesive layer is substantially resistant to solution by a solvent selected from the group consisting of methyl alcohol and isopropyl alcohol.

4. A cleaning tape roll according to claim 1; wherein said adhesive layer comprises a cross-linking agent.

5. A cleaning tape roll according to claim 4; wherein said cross-linking agent comprises ammonium zirconium carbonate.

6. A cleaning tape roll according to claim 4; wherein said adhesive layer comprises cross-linked polyvinyl alcohol.

7. A cleaning tape roll accordingly to claim 4; wherein said adhesive layer is curable at substantially room temperature.

8. A cleaning tape roll accordingly to claim 4; wherein said adhesive layer is curable at temperatures substantially above room temperature.

9. A cleaning tape roll according to claim 1; wherein said tape is a woven cotton fabric.

10. A cleaning tape formed of a strip having opposite side edges and an adhesive at said edges for stabilizing said edges, wherein said adhesive is substantially solvent resistant.

11. A cleaning tape according to claim 10; wherein said adhesive is substantially resistant to solution by a solvent selected from the group consisting of methyl alcohol and isopropyl alcohol.

12. A cleaning tape accordingly to claim 10; wherein said adhesive layer comprises a cross-linking agent and is curable at substantially room temperature.

13. A cleaning tape accordingly to claim 10; wherein said adhesive layer comprises a cross-linking agent and is curable at temperatures substantially above room temperature.

14. A cleaning tape according to claim 11; wherein said adhesive comprises a cross-linking agent that includes ammonium zirconium carbonate.

15. A cleaning tape according to claim 14; wherein said adhesive comprises polyvinyl alcohol.

16. A cleaning tape according to claim 15; wherein said strip is a woven cotton fabric.

* * * * *